ary of the internal combustion engine during idling. During

(12) United States Patent
Tumback et al.

(10) Patent No.: US 7,971,665 B2
(45) Date of Patent: Jul. 5, 2011

(54) MOTOR VEHICLE COMPRISING A HYBRID DRIVE AND METHOD FOR CONTROLLING THE IDLE SPEED OF A HYBRID DRIVE OF A MOTOR VEHICLE

(75) Inventors: Stefan Tumback, Stuttgart (DE); Dieter Hoetzer, Markgroenningen (DE); Nicole Weber, Salach (DE)

(73) Assignee: Robert Bosch GmbH, Stuttgart (DE)

( * ) Notice: Subject to any disclaimer, the term of this patent is extended or adjusted under 35 U.S.C. 154(b) by 889 days.

(21) Appl. No.: 10/525,425

(22) PCT Filed: Jan. 30, 2003

(86) PCT No.: PCT/DE03/00244
§ 371 (c)(1),
(2), (4) Date: Aug. 30, 2005

(87) PCT Pub. No.: WO2004/026606
PCT Pub. Date: Apr. 1, 2004

(65) Prior Publication Data
US 2006/0102393 A1    May 18, 2006

(30) Foreign Application Priority Data
Sep. 5, 2002 (DE) .................................. 102 41 018

(51) Int. Cl.
*B60K 6/00* (2007.10)
(52) U.S. Cl. ................. 180/65.21; 180/65.24; 180/65.28

(58) Field of Classification Search ................. 180/65.2, 180/65.4, 65.21, 65.24, 65.28
See application file for complete search history.

(56) References Cited

U.S. PATENT DOCUMENTS

| 4,335,429 A * | 6/1982 | Kawakatsu .................... 701/102 |
| 6,109,237 A | 8/2000 | Pels et al. |
| 6,208,931 B1 | 3/2001 | Schoettle et al. |

FOREIGN PATENT DOCUMENTS

| DE | 31 07 529 | 12/1981 |
| DE | 195 32 163 | 3/1997 |
| DE | 19624343 | 1/1998 |
| DE | 197 04 153 | 8/1998 |
| DE | 100 47 969 | 5/2001 |
| EP | 1 221 394 | 7/2002 |
| JP | 2001505847 T | 5/2001 |
| JP | 2001510522 T | 7/2001 |
| WO | WO 99 21261 | 4/1999 |

\* cited by examiner

*Primary Examiner* — J. Allen Shriver, II
*Assistant Examiner* — Bridget Avery
(74) *Attorney, Agent, or Firm* — Kenyon & Kenyon LLP

(57) ABSTRACT

A motor vehicle having a hybrid drive and a method for idle-speed control of a hybrid drive of a motor vehicle are provided. The hybrid drive includes an internal combustion engine having an engine management system, and at least one speed-controlled electric machine which is coupled to a drive shaft of the internal combustion engine during idling. During idling, the internal combustion engine is controlled by the engine management system in open or closed loop as a function of power demands of an electrical system of the motor vehicle.

14 Claims, 1 Drawing Sheet

MOTOR VEHICLE COMPRISING A HYBRID DRIVE AND METHOD FOR CONTROLLING THE IDLE SPEED OF A HYBRID DRIVE OF A MOTOR VEHICLE

FIELD OF THE INVENTION

The present invention relates to a motor vehicle having a hybrid drive and to a method for idle-speed control of a hybrid drive of a motor vehicle.

BACKGROUND INFORMATION

Motor vehicles having a hybrid drive include, in addition to a conventional internal combustion engine, one or possibly more associated electric machines that are able to be coupled or fixedly connected to a drive shaft in the drive train of the motor vehicle and able to operate both in generator mode and in motor mode. When in generator mode, the electric machines are driven by the internal combustion engine and are able to generate electric current to supply loads of the motor vehicle, whereas in the motor mode, the electric machines are supplied with current from the vehicle battery to convert this current into motive power for the motor vehicle or into starting power for the internal combustion engine. In addition to the vehicle battery as a power storage device, a flywheel or a different kinetic energy storage device could be provided, for example, to allow kinetic energy released during braking to be stored and supplied to loads of the motor vehicle via the electric machine, or to be supplied to the drive train thereof at a later time.

During speed-controlled idle operation of the internal combustion engine, the electric machine is automatically operated in generator mode.

In motor vehicles having a hybrid drive, the open and closed-loop control tasks required for the operation of the internal combustion engine and the electric machine are generally distributed in the same way as in conventional motor vehicles. This means that the control of the rotational speed of the internal combustion engine is assumed by the electronic engine management system, which measures the speed and calculates control variables, such as injection quantity, ignition angle, or air quantity for the internal combustion engine, using suitable control methods so as to adjust or maintain the predetermined idling speed. In contrast, the voltage regulation of a vehicle electrical system and a charging control of a battery of the motor vehicle are accomplished in that power required by the vehicle electrical system or for charging the battery is provided by the electric machine with the aid of a controller of the electric machine.

However, the functions performed in the electronic engine management system to control the speed of the internal combustion engine are very complex because the control can only be carried out at the moment of ignition of the internal combustion engine, which results in a idle-speed control that is moderately fast and more or less smooth, depending on the number of cylinders. Moreover, a relatively high degree of complexity is necessary because the control must be stable under all operating conditions and protected against numerous disturbances.

In contrast, the speed of an electric machine can be controlled relatively easily and, moreover, torque control can be implemented with little effort and good results.

A motor vehicle having a hybrid drive and a method for idle-speed control of a hybrid drive of a motor vehicle are described in published German Patent Application DE 195 32 163. The method is used to reduce rotational irregularities of a shaft, in particular of the drive shaft of an internal combustion engine, and an electric machine coupled, or able to be coupled, to the drive shaft is controlled in such a manner that the rotational irregularities thereof are reduced. Moreover, due to its speed and performance, the controller responsible for controlling the electric machine may also be used to perform engine management tasks, including, for example, control of the speed of the internal combustion engine during idling, while on the other hand, the engine management system may assume one or more tasks of the controller of the electric machine, such as control torque of the electric machine.

In this connection, however, problems may arise with respect to the power demands of the electrical system of the motor vehicle because the vehicle electrical system must be subordinated to the requirements of the idle-speed control when the intention is to adjust and maintain a predetermined idling speed with the aid of the electric machine. If, for example, immediately after the start of the motor vehicle when the internal combustion engine is idling, an electrical load, such as a rear-window heater, is switched on while at the same time a battery charge controller of the motor vehicle requests current to be supplied for charging the vehicle battery, then the electric power required for this from the electric machine cannot be provided immediately because this would in turn have negative effects on the control of the speed of the internal combustion engine.

SUMMARY

The motor vehicle having a hybrid drive and a method for idle-speed control according to the present invention have the advantage over the related art that the power demands of the vehicle electrical system during idling may be immediately and essentially fully met by controlling the internal combustion engine in open or closed loop as a function of the requirements of the vehicle electrical system, without consideration of the speed control. By substituting the speed controller of the internal combustion engine by at least one speed-controlled electric machine during idling, it is also possible to improve the control performance and to reduce the extent of application of the idle-speed controller. Furthermore, a deactivated, engine-side idle-speed controller allows a considerable reduction in fuel consumption and exhaust gases.

In the context of the present patent invention, the electric power requested for charging a battery of the motor vehicle and optionally also the electric power consumed by the electrical loads of the motor vehicle at the same time are referred to as the power demands of the vehicle electrical system.

In an example embodiment of the present invention, the power output of the internal combustion engine is adjusted to the instantaneous power demand of the electrical system of the motor vehicle by ascertaining, as a function of the instantaneous power demand, a desired or setpoint torque of the internal combustion engine at which the electric power output of the electric machine is approximately equivalent to the power demands of the vehicle electrical system.

The electric power that needs to be provided by the electric machine to meet the power demands of the vehicle electrical system is taken as the basis for ascertaining this desired or setpoint torque of the internal combustion engine.

This necessary power mainly includes the electric power required to charge the vehicle battery and the electric power consumed by the electrical loads of the motor vehicle during idling.

The electric power required to charge the battery may be determined by measuring the battery voltage or, in accordance with an example embodiment of the present invention, in that, in addition to the battery voltage, the instantaneous state of charge of the battery is also determined and included in the calculations for determining the electric power required to charge the battery.

In order to determine the electric power required by the electrical loads of the motor vehicle during idling, it is possible to query the on-state of all possible loads and to add up the nominal power of the loads that are turned on at a time. Possible loads may be, for example, a rear-window heater or a seat heater of the motor vehicle, or parts of the lighting system, which are frequently turned on immediately after starting the motor vehicle while the vehicle is still idling, as well as electrical control units of the motor vehicle that are automatically put into operation when starting the motor vehicle and which require electric power during operation.

The electric power that is calculated from these parameters and which needs to be provided by the electric machine to meet the power demands of the vehicle electrical system is subsequently converted to the desired or setpoint torque of the internal combustion engine; a further influencing parameter, e.g., the current engine temperature and/or the rotational speed of the internal combustion engine, may be taken into account via a precontrol. Conveniently, the precontrol includes a characteristics map to be applied, in which the aforementioned further influencing parameter is included. The precontrol ensures that a measured power output of the electric machine driven by the internal combustion engine is approximately equivalent to the calculated power demand.

Since, for the sake of simplification, it may not be useful to consider all possible influencing parameters in ascertaining the desired or setpoint torque, and because minor deviations between the calculated and the actual power output of the electric machine are to be expected, another example embodiment of the present invention provides to measure the actual power output of the electric machine, and to determine possible deviations between the measured and the calculated power by comparing the two values, as well as to compensate for possible deviations via a connected slow controller of the engine management system or the control unit of the electric machine, by adjusting the desired or setpoint torque of the internal combustion engine according to the result of the comparison.

In a Diesel engine, the adjustment of the desired or setpoint torque can be accomplished by suitably varying the injection quantity, while in a gasoline engine, it may be adjusted by suitably varying the air quantity, or optionally also by changing the ignition timing.

DETAILED DESCRIPTION

Figure 1:
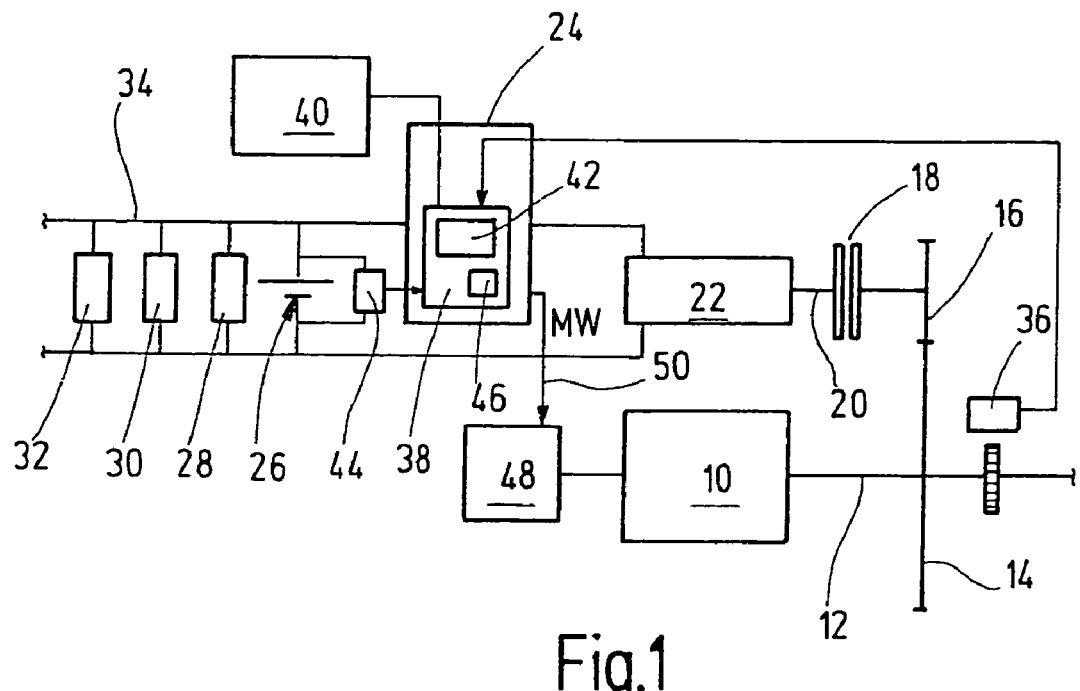
FIG. 1 shows a schematic representation of a hybrid drive of a motor vehicle including an internal combustion engine and an electric machine.

The motor vehicle hybrid drive shown in FIG. 1 includes an internal combustion engine 10, whose crankshaft 12 is able to be coupled via two gear wheels 14, 16 and a clutch 18 to the output shaft 20 of an electric machine 22 of the motor vehicle.

Electric machine 22 has a control unit 24 and is connected via control unit 24 to a battery 26 of the motor vehicle, and the battery supplies DC current to a plurality of loads 28, 30, 32, etc., in an electrical system 34 of the motor vehicle. Loads 28, 30, 32 include all electrically operated units of the motor vehicle, such as the rear-window heater, the radio, the glow plug, and the individual lamps of the lighting system. Control unit 24 is also connected to an angle sensor 36 for determining the rotational speed of crankshaft 12.

Electric machine 22 serves as a starter-generator for internal combustion engine 10. Each time the motor vehicle is started, the electric machine is initially brought to a predetermined speed by the supply of power from battery 26, whereupon clutch 18 is closed and internal combustion engine 10 is started by electric machine 22 in a torque-controlled or speed-controlled manner. Once internal combustion engine 10 has reached a predetermined idling speed, control unit 24 recognizes the end of starting by the signals from angle sensor 36. After that, internal combustion engine 10 is speed-controlled with the aid of electric machine 22 and control unit 24, the electric machine 22 ensuring that the predetermined idling speed is maintained. During speed-controlled idle operation, electric machine 22 automatically goes into generator mode, in which it supplies current to battery 26.

Control unit 24 of electric machine 22 is equipped with a computer 38 to which the on-state of the individual loads 28, 30, 32 of vehicle electrical system 34 is transmitted by a central on-board computer 40 of the motor vehicle. Computer 38 further includes a memory 42, in which the nominal power values of the individual loads 28, 30, 32 are stored. Moreover, computer 38 is connected to a battery controller 44, which determines the instantaneous terminal voltage and the instantaneous state of charge of battery 26, and which ensures that battery 26 is charged when necessary, for example, when the state of charge falls below a level of 70%.

Based on the signals from on-board computer 40 and battery controller 44, computer 38 determines, during idling, the current power demand for charging battery 26 and the current power demand of turned-on loads 28, 30, 32, which is obtained by adding up the nominal power values of turned-on loads 28, 30, 32. This power demand during idling is essentially equivalent to the total power demand of vehicle electrical system 34 that needs to be provided by the electric machine when operating in generator mode.

Control unit 24 also includes a measuring device 46 for measuring the current intensity of the electric current flowing from electric machine 22 into the vehicle electrical system 34. The current intensity, in conjunction with the voltage of vehicle electrical system 34, allows calculation of the actual power output from electric machine 22 into vehicle electrical system 34.

Internal combustion engine 10, which is designed as a Diesel engine, has an engine management system 48 which, unlike in conventional internal combustion engines, is not used to control the idling speed of internal combustion engine 10, but to control the Diesel fuel injection quantity during idling as a function of a desired or setpoint torque MW transmitted by control unit 24 via a line 50 to engine management system 48. When, during idling, internal combustion engine 10 is speed-controlled by electric machine 22, the power output of electric machine 22 may be controlled via this requested desired or setpoint torque MW and be adjusted to the instantaneous power demand of vehicle electrical system 34.

Figure 2:
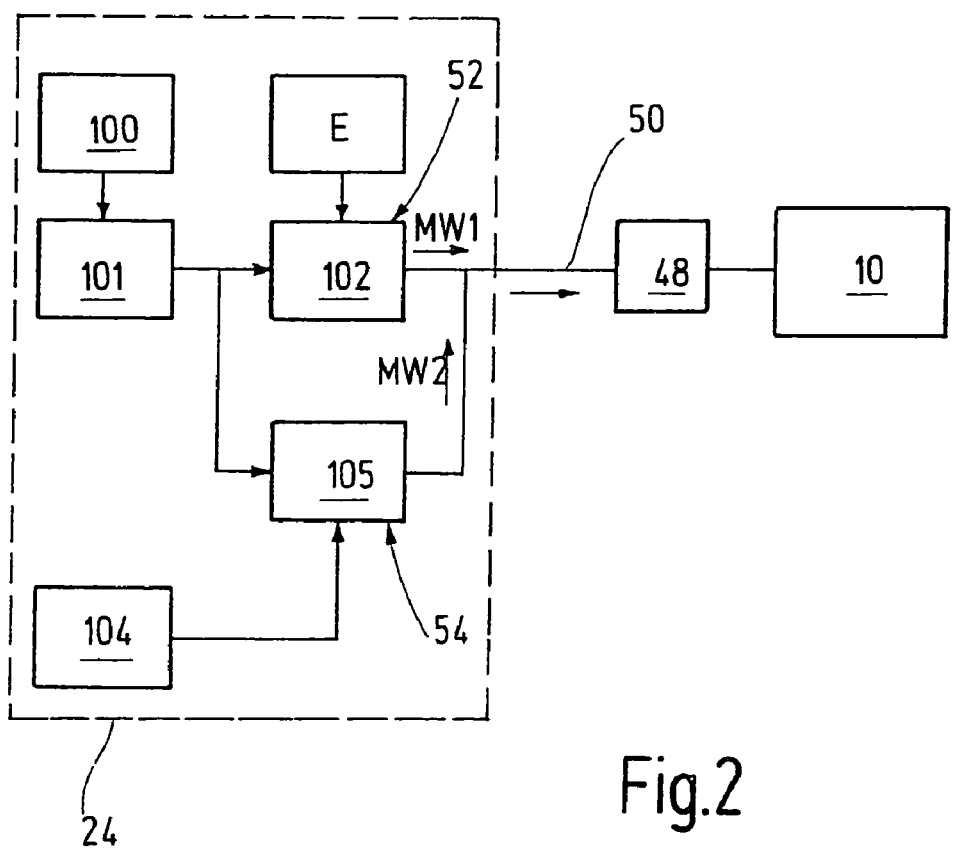
FIG. 2 shows a signal flow diagram of an example embodiment of the idle-speed control of the hybrid drive.

As shown in FIG. 2, the requested desired or setpoint torque MW is ascertained in that in a first step 100, the instantaneous total power demand of vehicle electrical system 34 is determined by computer 38 in control unit 24, as described above. The power that must be supplied by electric machine 22 to the vehicle electrical system 34 to meet this power demand is calculated from this total power demand in a second step 101, taking into account a possible power loss. In a third step 102, this power demand is converted to desired or setpoint torque MW1 via a precontrol 52. Precontrol 52 is essentially made of a characteristics map to be applied. The current engine temperature and, possibly, the rotational speed of internal combustion engine 10 may be taken into account as a further input variable E.

Desired or setpoint torque MW1 output by precontrol 52 is fed via line 50 to engine management system 48, which then adjusts the Diesel fuel injection quantity in such a manner that internal combustion engine 10 delivers the desired or setpoint torque MW1 to crankshaft 12.

At this desired or setpoint torque MW1, the actual power output from electric machine 22 into vehicle electrical system 34 is essentially equivalent to the calculated power demand. In order to identify possible deviations, if necessary, and to adjust the power output of electric machine 22 even better to the power demand of vehicle electrical system 34, the actual power output of electric machine is determined by computer 38 in a fourth step 104 with the aid of measuring device 46 and compared, in a comparator circuit or using a suitable software of computer 38, to the power output calculated in step 101.

In case of an upward or downward deviation, this deviation is corrected by a connected slow controller 54 in a fifth step 105 so that the output variable transferred by control unit 24 to engine management system 48 is a desired or setpoint torque MW2 which, in accordance with the deviation, is slightly greater or less than desired or setpoint torque MW1. This slow control in step 105 operates with a response time of several seconds during which the deviation is buffered by battery 26.

What is claimed is:

1. A hybrid drive system for a motor vehicle, comprising:
   an internal combustion engine having a drive shaft and an engine management system; and
   at least one speed-controlled electric machine coupled to the drive shaft of the internal combustion engine during idling;
   means for determining overall power demands of an electrical system of the motor vehicle during idling, wherein the electrical system of the motor vehicle includes all electrically operated units of the motor vehicle;
   a pre-control unit for converting the overall power demands of the electrical system of the motor vehicle during idling into a setpoint torque of the internal combustion engine;
   wherein, during idling, the engine management system controls the internal combustion engine in one of open and closed loop as a function of the overall power demands of the electrical system of the motor vehicle;
   wherein during idling the internal combustion engine is speed-controlled with the aid of the electric machine;
   wherein a power output of the internal combustion engine is adjusted to an instantaneous overall power demand of the electrical system of the motor vehicle; and
   wherein the setpoint torque of the internal combustion engine is determined as a function of the instantaneous overall power demand of the electrical system of the motor vehicle, and at least one of an injection quantity, an air quantity, and an ignition angle of the internal combustion engine is adjusted according to the determined setpoint torque.

2. The hybrid drive system as recited in claim 1, wherein the means for determining the power demands of the electrical system of the motor vehicle during idling include means for at least one of measuring a terminal voltage and determining a state of charge of a battery of the motor vehicle.

3. The hybrid drive system as recited in claim 1, wherein the means for determining the power demands of the electrical system of the motor vehicle during idling include means for detecting turned-on loads associated with the electrical system and calculating a nominal power of the turned-on loads.

4. The hybrid drive system as recited in claim 1, further comprising:
   means for measuring a power output of the at least one speed-controlled electric machine.

5. The hybrid drive system as recited in claim 4, wherein the means for determining the power demands of the electrical system of the motor vehicle include a comparator device for comparing a power output of the at least one speed-controlled electric machine calculated from the power demands of the electrical system and a measured power output of the at least one speed-controlled electric machine.

6. The hybrid drive system as recited in claim 5, further comprising:
   a slow controller for adjusting one of the desired torque and the setpoint torque of the internal combustion engine depending on an output variable of the comparator device.

7. A method for idle-speed control of a hybrid drive of a motor vehicle having an internal combustion engine and at least one speed-controlled electric machine, comprising:
   coupling the at least one speed-controlled electric machine to a drive shaft of the internal combustion engine during idling; and
   one of adjusting and maintaining a predetermined idling speed of the internal combustion engine during idling, with the aid of the at least one speed-controlled electric machine;
   wherein, during idling, the internal combustion engine is controlled in one of open and closed loop as a function of overall power demands of an electrical system of the motor vehicle with the aid of the engine management system, and wherein the electrical system of the motor vehicle includes all electrically operated units of the motor vehicle;
   wherein a power output of the internal combustion engine is adjusted to an instantaneous overall power demand of the electrical system of the motor vehicle; and
   wherein a setpoint torque of the internal combustion engine is determined as a function of the instantaneous overall power demand of the electrical system of the motor vehicle, and at least one of an injection quantity, an air quantity, and an ignition angle of the internal combustion engine is adjusted according to the determined setpoint torque.

8. The method as recited in claim 7, wherein a power output of the at least one speed-controlled electric machine necessary for meeting the power demands of the electrical system of the motor vehicle is calculated and used to determine the setpoint torque of the internal combustion engine.

9. The method as recited in claim 7, wherein at least one of a terminal voltage and a state of charge of a battery of the motor vehicle is measured to determine the power demands of the electrical system of the motor vehicle.

10. The method as recited in claim 7, wherein, to determine the power demands of the electrical system of the motor vehicle, turned-on loads associated with the electrical system of the motor vehicle are detected and nominal powers of the turned-on loads are summed.

11. The method as recited in claim 8, wherein the calculated power output of the at least one speed-controlled electric machine is converted to one of a desired torque and the setpoint torque using a pre-control unit.

12. The method as recited in claim 8, wherein an actual power output of the at least one speed-controlled electric machine is measured and compared to the calculated power output of the at least one speed-controlled electric machine.

13. The method as recited in claim 11, wherein the pre-control unit includes a characteristics map to be applied, and wherein the pre-control unit takes into account at least one of an engine temperature and a rotational speed of the internal combustion engine as a further input variable in the conversion of the calculated power output to one of the desired torque and the setpoint torque.

14. The method as recited in claim 12, wherein in case of a deviation of the measured power output of the at least one speed-controlled electric machine and the calculated power output of the at least one speed-controlled electric machine, the setpoint torque is slowly adjusted.

* * * * *